US006028318A

United States Patent [19]

Cornelius

[11] Patent Number: 6,028,318

[45] **Date of Patent: *Feb. 22, 2000**

[54] PRINT MEDIA WEIGHT DETECTION SYSTEM

[75] Inventor: William L. Cornelius, Boise, Id.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/928,767

[22] Filed: Sep. 12, 1997

[51] Int. Cl.[7] .................................................... G01N 21/86

[52] U.S. Cl. ......................................... 250/559.27; 400/56

[58] Field of Search ......................... 250/559.19, 559.27, 250/559.28, 223 R; 400/56, 708

[56] References Cited

U.S. PATENT DOCUMENTS

| | | | |
|---|---|---|---|
| 3,171,034 | 2/1965 | Tomasulo et al. | 250/214 PR |
| 3,968,364 | 7/1976 | Miller | 250/559.27 |
| 4,060,734 | 11/1977 | Tilley et al. | 250/559.27 |
| 4,866,984 | 9/1989 | Houghton | 73/159 |
| 4,937,460 | 6/1990 | Duncan et al. | 250/561 |
| 5,138,178 | 8/1992 | Wong et al. | 250/559 |
| 5,204,537 | 4/1993 | Bennet et al. | 250/560 |

FOREIGN PATENT DOCUMENTS

| | | | |
|---|---|---|---|
| 03050582 | 5/1991 | Japan | G03G 15/14 |

OTHER PUBLICATIONS

U.S. application No. 08/806,994; Feb. 26, 1997 (Pending Application); “Sheet Media Weight Detector And Method” (as originally filed).

*Primary Examiner*—Edward P. Westin
*Assistant Examiner*—Kevin Pyo

[57] ABSTRACT

A device that automatically detects the stiffness of the paper as an indicator of paper weight and thickness. The detection system of the invention includes a moveable media guide and a sensor responsive to movement of the guide. It is desirable that the media guide have a curved media contact surface to resist the paper as it is pushed along the guide. A biasing element operatively coupled to the guide may be used to regulate the resistance of the guide to the advancing paper. Stiff heavier weight paper causes the guide to move as the paper is pushed along the contact surface of the guide. Less stiff lighter weight paper will not cause the guide to move, or at least not as much as the stiff heavier weight paper. A sensor responds to the movement of the guide to detect the stiffness and, therefore, the weight of the paper.

9 Claims, 5 Drawing Sheets

PRINT MEDIA WEIGHT DETECTION SYSTEM

FIELD OF THE INVENTION

The invention relates generally to detecting the weight of paper and other print media in image forming devices such as printers and copiers and controlling printing operations according to the detected paper weight. More particularly, the invention relates to a sensing device that detects the stiffness of the paper as an indicator of paper weight.

BACKGROUND OF THE INVENTION

Automatically detecting the weight of the paper or other print media used in a printer, copier or other image forming device is desirable to help maintain good print quality. In laser printers and other electrophotographic image forming devices, the weight of the paper, as a discrete characteristic of the paper and as an indicator of paper thickness, is an important factor in determining the fusing temperature and pressure, the pick force necessary to feed each sheet into the printer, the speed at which the paper is advanced through the printer and the transfer current needed for good print quality. For example, heavier paper requires a greater pick force, higher fuser temperatures and pressures and often must be outputted face down to reduce curl.

Electrophotographic printers typically do not detect and automatically adjust for different weight papers. Some printers allow the operator to manually select a heavy paper setting in the computer printer driver or to adjust the fuser temperature on the printer control panel to maintain good print quality on heavy paper. Manual selection, however, is only effective if the operator is able to, and actually does, select the correct paper setting or fuser temperature. Manual selection is sometimes not practicable even for a knowledgeable and diligent operator, particularly when the paper is changed frequently among different weight and thickness papers and from several different input sources.

SUMMARY OF THE INVENTION

The present invention is directed to a device and method to automatically detects the stiffness of the paper as an indicator of paper weight and thickness. Paper and other flat print media have a certain stiffness—the resistance to curving or bending. Although not always proportional, lighter media is less stiff and heavier media is more stiff. The present invention takes advantage of the relative stiffness of different weight paper or other print media to give the printer feed back about the type of paper moving through the printer. The detection system of the invention includes a moveable media guide and a sensor responsive to movement of the guide. It is desirable that the media guide have a curved media contact surface to resist the paper as it is pushed along the guide. A biasing element operatively coupled to the guide may be used to regulate the resistance of the guide to the advancing paper. Stiff heavier weight paper causes the guide to move as the paper is pushed along the contact surface of the guide. Less stiff lighter weight paper will not cause the guide to move, or at least not as much as the stiff heavier weight paper. A sensor responds to the movement of the guide to detect the stiffness and, therefore, the weight of the paper.

DETAILED DESCRIPTION OF THE INVENTION

Figure 1:
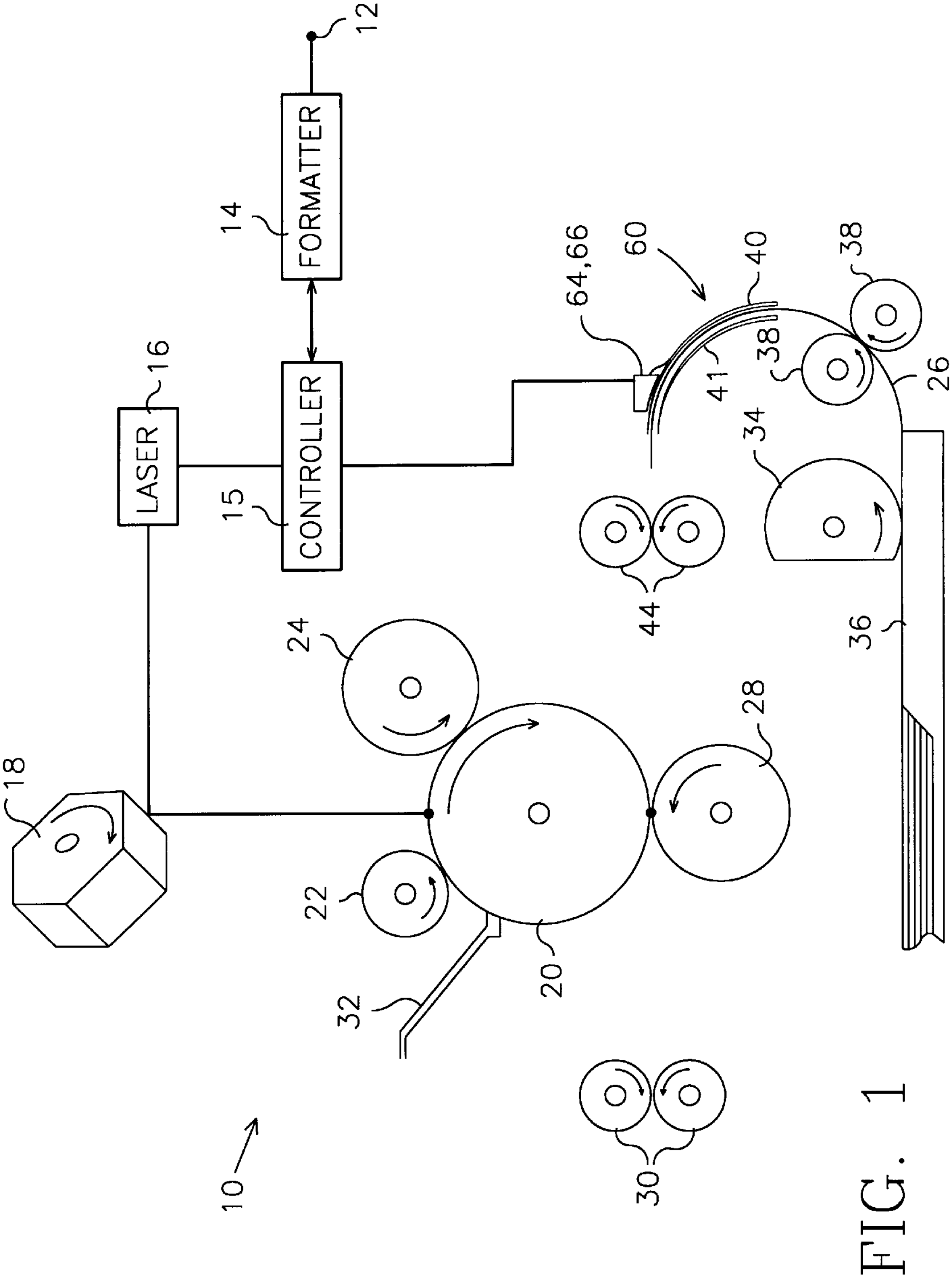
FIG. 1 is a diagrammatic representation of a laser printer.
Figure 2:
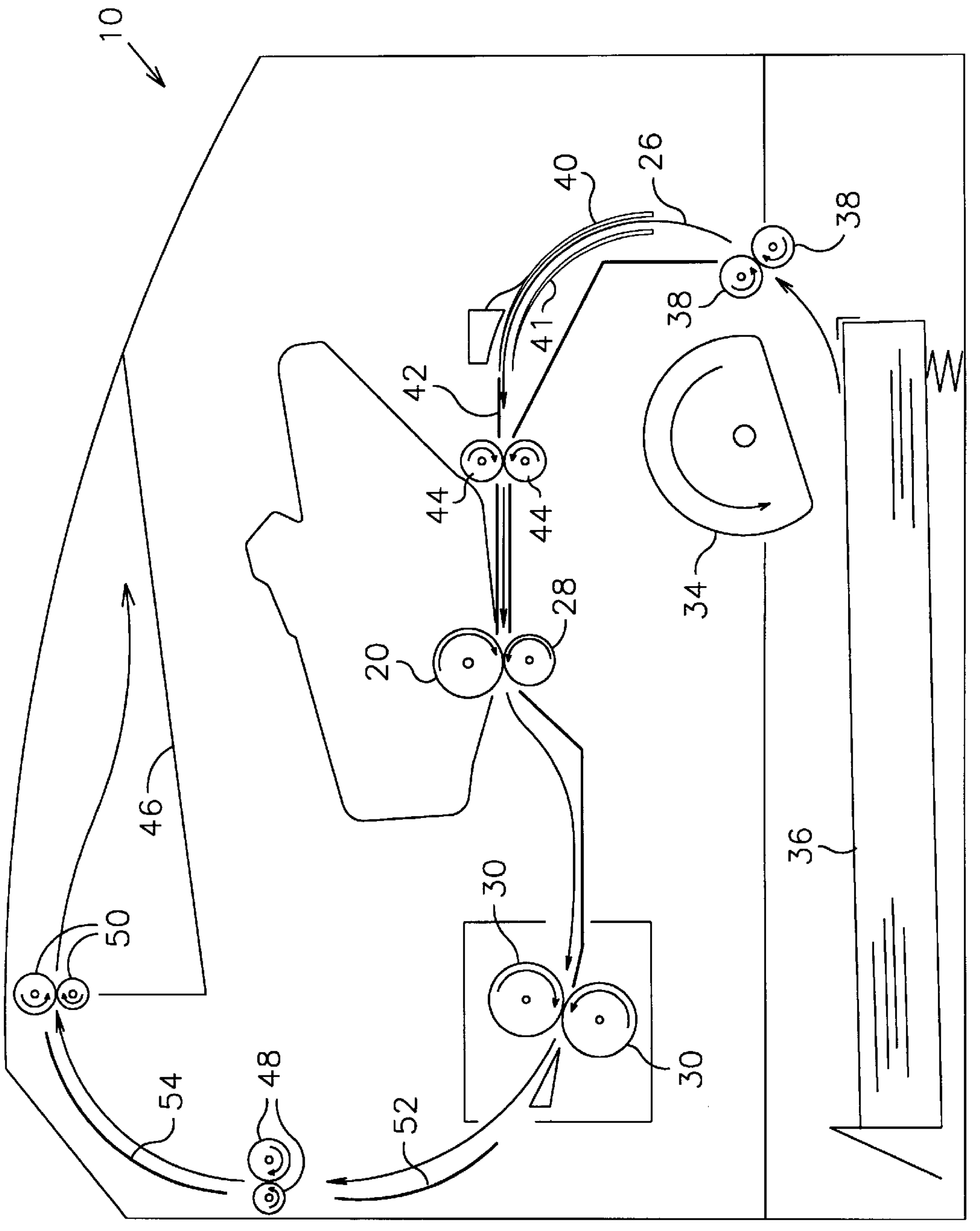
FIG. 2 is a sectional side view of the laser printer of FIG. 1 showing the paper path through the major components of the printer.

Although it is expected that the automatic paper weight detection system of the present invention will be most useful in electrophotographic printing devices such as the laser printer illustrated in FIGS. 1 and 2, the system can be used in various types of printers, copiers and other image forming devices. FIGS. 1 and 2 illustrate a laser printer, designated by reference number 10, adapted for use with the invented paper weight detection system. Referring to FIG. 1, a computer transmits data representing an image to input port 12 of printer 10. This data is analyzed in formatter 14, which typically consists of a microprocessor and related programmable memory and page buffer. Formatter 14 formulates and stores an electronic representation of each page that is to be printed. Once a page has been formatted, it is transmitted to the page buffer. The page buffer breaks the electronic page into a series of lines or "strips" one dot wide. Each strip of data is sent to printer controller 15. Controller 15, which also includes a microprocessor and programmable memory, drives laser 16 and controls the drive motor(s), fuser temperature and pressure, and the other print engine components and operating parameters.

Each strip of data is used to modulate the light beam produced by laser 16 such that the beam "carries" the data. The light beam is reflected off a multifaceted spinning mirror 18. As each facet of mirror 18 spins through the light beam, if reflects or "scans" the beam across the side of a photoconductive drum 20. Photoconductive drum 20 rotates on a motor-driven shaft such that it advances just enough that each successive scan of the light beam is recorded on drum 20 immediately after the previous scan. In this manner, each strip of data is recorded on photoconductive drum 20 as a line one after the other to reproduce the page on the drum.

Charging roller 22 charges photoconductive drum 20 to a relatively high substantially uniform negative polarity at its surface. The areas on the fully charged drum 20 exposed to the light beam from laser 16 represent the desired print image. The exposed areas of drum 20 are partially or fully discharged, depending on the intensity of the light beam and the duration of exposure. The unexposed background areas of drum 20 remain fully charged. This process creates a latent electrostatic image on conductive drum 20. Developer roller 24 transfers toner onto photoconductive drum 20. Typically, a dry magnetic insulating toner is used. The toner is attracted to developer roller 24 by an internal magnet. The toner particles are charged to have a negative polarity. Developer roller 24 is electrically biased to repel the negatively charged toner to the discharge image areas on drum 20. In this way, the toner is transferred to photoconductive drum 20 to form a toner image on the drum.

The toner is transferred from photoconductive drum 20 onto paper 26 as paper 26 passes between drum 20 and transfer roller 28. Transfer roller 28 is electrically biased to impart a relatively strong positive charge to the back side of paper 26 as it passes by drum 20. The positive charge attracts the negatively charged toner and pulls it from drum 20 to form the image on paper 26. The toner is then fused to paper 26 as the paper passes between heated fusing rollers 30. Drum 20 is cleaned of excess toner with cleaning blade 32.

Referring now also to FIG. 2, each sheet of paper 26 is advanced to the photoconductive drum 20 through a series of rollers and paper guides. Feed roller 34 picks the top sheet of paper from the stack in paper tray 36 and advances it to a pair of transport rollers 38. As transport rollers 38 further advance paper 26, paper guides 40, 41 and 42 turn the paper 90° toward registration rollers 44. Registration rollers 44 advance paper 26 to drum 20 and transfer roller 28 where toner is applied as described above. Paper 26 then moves through the heated fuser rollers 30 and toward output bin 46. As transport rollers 48 and 50 advance paper 26, paper guides 52 and 54 turn the paper into output bin 46.

Figure 3:
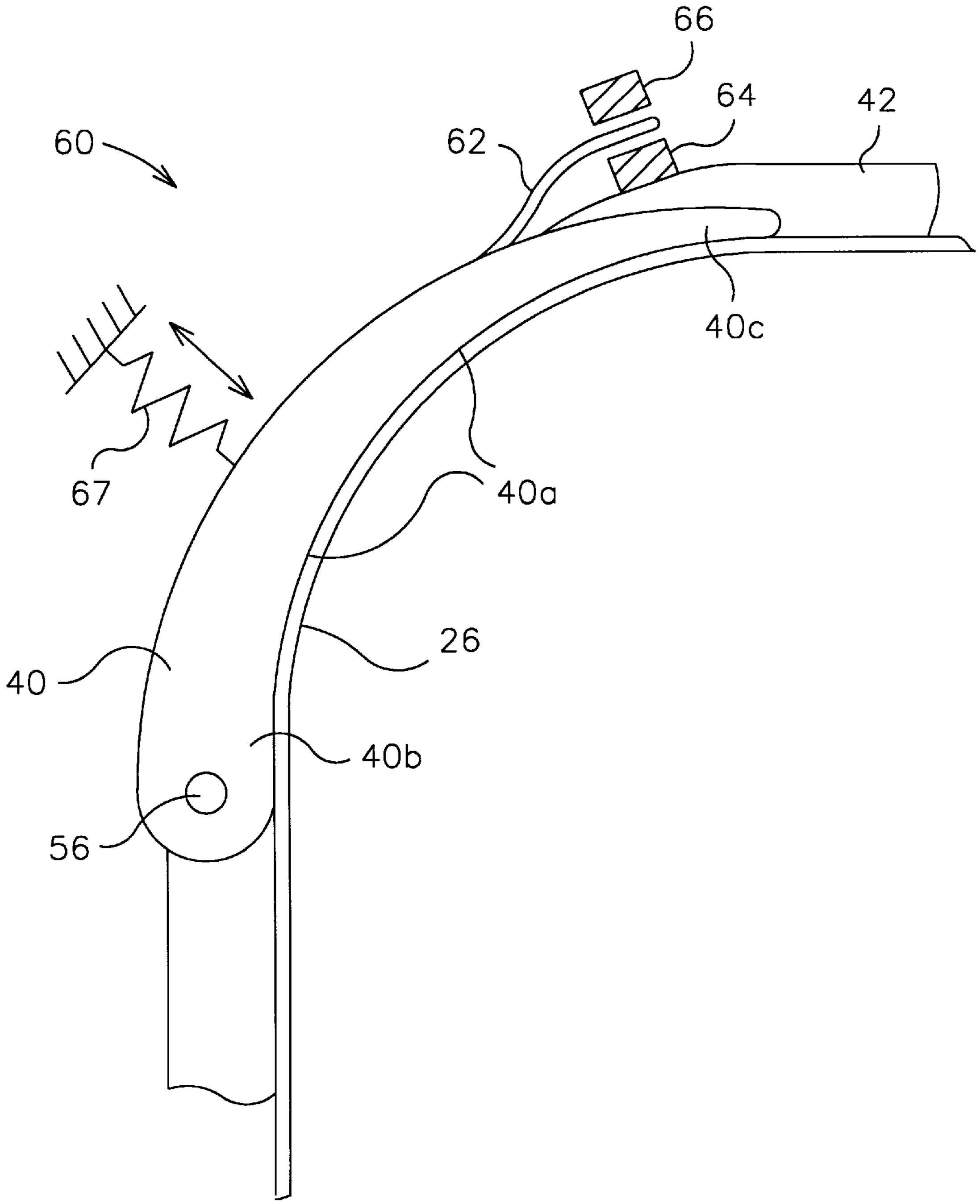
FIG. 3 is a detail side view of one embodiment of the automatic paper weight detection system.

FIG. 3 is a detail view of one embodiment of the paper weight detection system. The detection system, which is also referred to as the "detector", is indicated generally by reference number 60. In this embodiment, the outer curved paper guide 40 that directs paper 26 toward registration rollers 44 is used to determine the weight of paper 26. Paper guide 40 is advantageous because (a) it is curved to resist the movement of paper 26 and (b) it is positioned before registration rollers 56 to detect the paper weight before the paper reaches photoconductive drum 20 and the other downstream print engine components. Other paper guides along the paper path could be used. Inner paper guide 41, for example, which is positioned before registration rollers 56 could also detect the paper weight before the paper reaches photoconductive drum 20.

Figure 6:
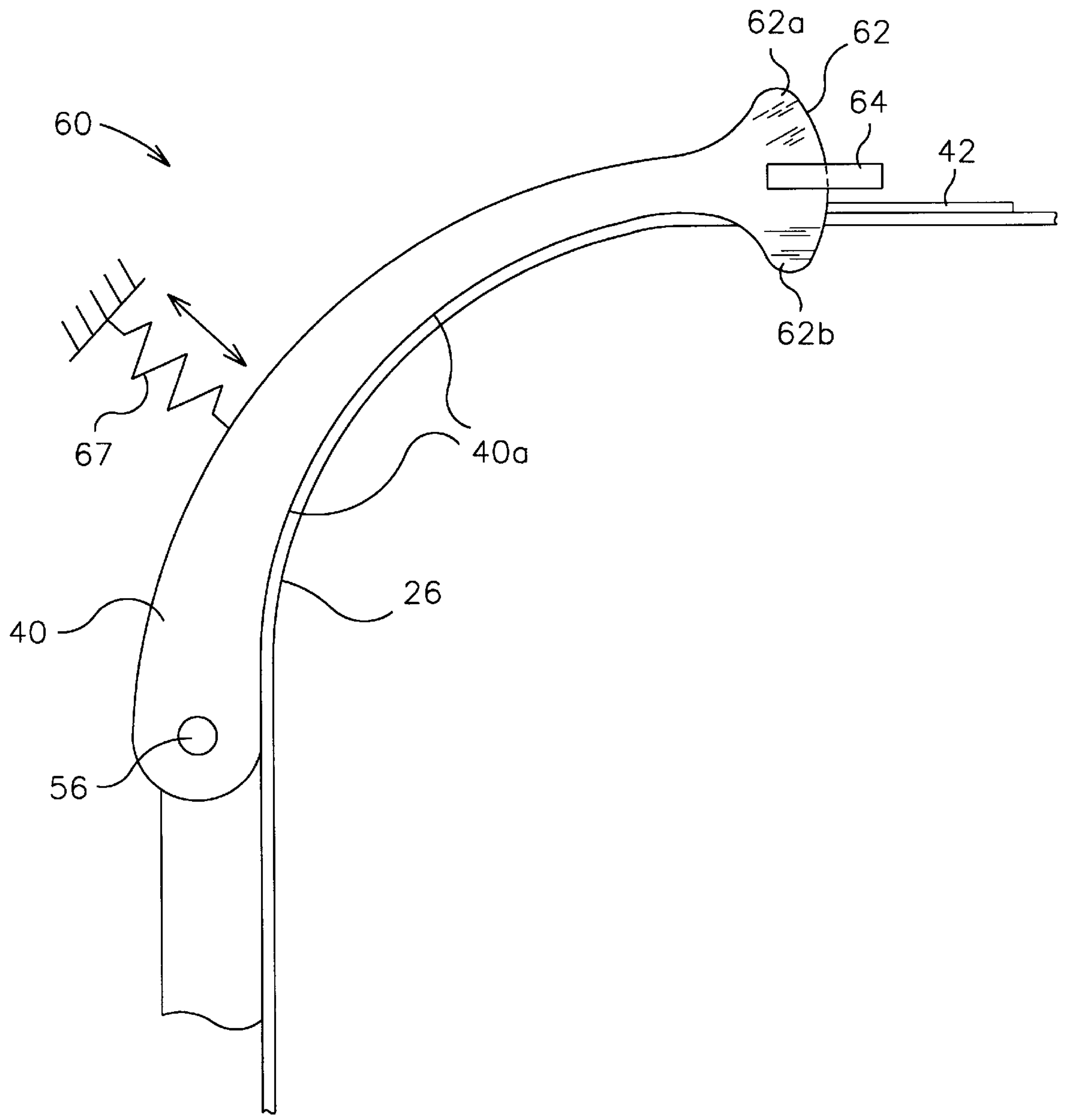
FIG. 6 a detail side view of a second embodiment of the automatic paper weight detection system.

Referring to FIG. 3, paper 26 moves along contact surface 40*a* of guide 40. A leading portion 40*b* of guide 40 is mounted to pin 56 so that guide 40 pivots on pin 56. Pivot pin 56 is mounted to or integral with the printer chassis or another stable printer component. Detector 60 includes guide 40, gate 62, sensors 64 and 66 and biasing element 67. Sensors 64 and 66 are electronically connected to controller 15, as shown in FIG. 1. Gate 62 controls the signals generated by sensors 64 and 66, which detect the position of guide 40. In this embodiment, gate 62 is constructed as an arm that extends away from the trailing portion 40*c* of paper guide 40 toward sensors 64 and 66. Other types of gates could also be used. For example, the arm could be omitted and a sensor activated by the end of guide 40, as shown in FIG. 6.

As paper 26 advances toward registration rollers 44, it pushes against guide 40 and tries to pivot guide 40 on pin 56 and thereby deflect gate 62. If and to what extent paper 26 deflects gate 62 is determined by the weight of the paper, which is reflected in its stiffness, and the force exerted on guide 40 by biasing element 67. In this embodiment, biasing element 67 is a spring connected between guide 40 and the printer chassis or another stable printer component. The amount of deflection of gate 62 is detected by sensors 66 and 64 and outputted to printer controller 15. The weight and thickness of paper 26 can be computed in the microprocessor of controller 15 according to the appropriate algorithm or model. The output from detector 60 is utilized by printer controller 15 to automatically control and direct operations of those print engine components and printing parameters that depend on paper weight or thickness, such as fusing temperature and pressure, the speed at which the paper is advanced through the printer and the transfer current (transfer current is the electric current or electrostatic force that moves the toner onto the paper). These parameters and the components that control them can all be adjusted by controller 15 according to the output of detector 60. It is desirable to position detector 60 upstream of photoconductive drum 20 so that the output signal of detector 60 may be utilized by printer controller 15 to control photoconductive drum 20 and the other downstream print engine components.

Figure 4:
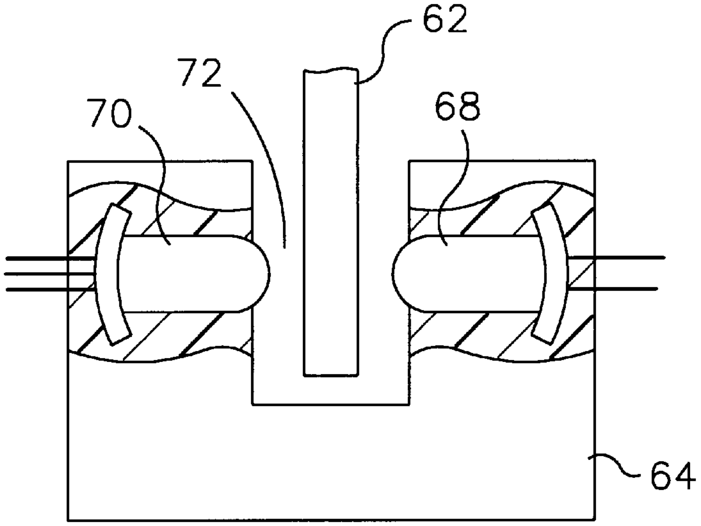
FIG. 4 is a top down plan view of a photoelectric sensor showing the LED and phototransistor.
Figure 5:
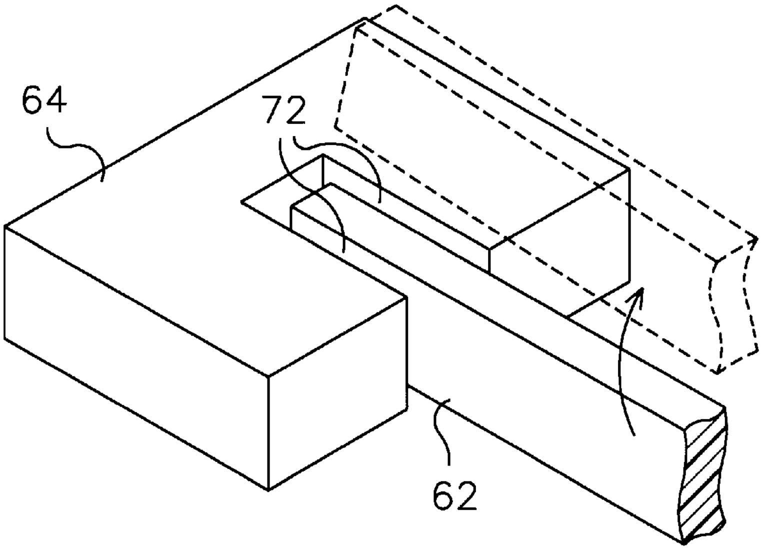
FIG. 5 is partial detail isometric view showing the gate member in the detection zone of one of the photoelectric sensors in the detection system.

Referring to FIG. 4, each sensor 64 and 66 includes a light emitting diode (LED) 68 and a phototransistor 70. A tungsten lamp, a neon lamp or any suitable source of light radiation, preferably infrared light, may be used an alternative to LED 68. Similarly, a photodiode, a photoresistor or any other suitable sensor of light may be used as an alternative to phototransistor 70. LED 68 and phototransistor 70 are mounted opposite one another in sensors 64 and 66. Gate 62 on guide 40 passes through a detection zone 72 between LED 68 and phototransistor 70, as best seen in FIG. 5. The output signal from phototransistor 70, which is transmitted to printer controller 15, indicates the presence or absence of gate 62 in detection zone 72.

In the embodiment of FIG. 3, if gate 62 stays in the detection zone of first sensor 64 as paper 26 moves along guide 40, then gate 62 blocks the light emitted by the LED in first sensor 64 and detector 60 outputs a light weight paper signal to controller 15. If gate 62 is pushed into the area between sensors 64 and 66 as paper 26 moves along guide 40 as shown in FIG. 3, then the phototransistors 70 in both sensors sense the light emitted by LEDs 68 and detector 60 outputs a medium weight paper signal to controller 15. If gate 62 moves into the detection zone of second sensor 66 as paper 26 moves along guide 40, then gate 62 blocks the light emitted by the LED in second sensor 66 and detector 60 outputs a heavy weight paper signal to controller 15. In general, light weight paper has a basis weight less than about 90 grams per square meter, medium weight paper has a basis weight between about 90 and 135 grams per square meter and heavy weight paper has a basis weight of greater than about 135 grams per square meter. Because most printer operations will utilize light weight paper, gate 62 and guide 40 should be biased to the light paper weight position. That is, the default position of detector 60 is, preferably, to the light paper weight position.

A biasing element is used to resist paper 26 as it moves along guide 40. In FIG. 3, the biasing element 67 is a spring. A torsional spring operatively coupled between guide 40 and pivot pin 56 could be substituted for spring 67 in FIG. 3. Other biasing elements are also possible. For example, the biasing element may be inherent in the resistance provided at the connection between guide 40 and pivot pin 56. What is important is that guide 40 provide the desired resistance to paper 26 as the paper engages and advances past the guide.

In the embodiment of detector 60 illustrated in FIG. 3, the phototransistor 70 of FIG. 4 acts as a digital ON/OFF device responding to the presence or absence of gate 62 in detection zone 72. In an alternative embodiment of detector 60 illustrated in FIG. 6, gate 62 is made to transmit a varying degree of the infrared light emitted by LED 68. The light transmissibility of gate 62 varies from a first translucent portion 62*a* to a second opaque portion 62*b*. Preferably, the degree of light transmission varies substantially in a continuum between the first translucent portion 62*a*, in which the light is transmitted freely, to the second opaque portion 62*b* in which the light is blocked. In this embodiment, phototransistor 70 acts as a linear analog device responding to the degree of light passing through gate 62 and, correspondingly, to the degree of deflection of paper 26. Thus, the degree of deflection and, therefore, the weight of the paper can be measured continuously rather than in discrete increments.

Although the invention has been shown and described with reference to the foregoing embodiments, alternative embodiments may be made without departing from the spirit and scope of the invention as defined in following claims.

What is claimed is:

1. A print media weight detector, comprising:

a movable media guide having a contact surface biased against a single sheet of print media advancing past the guide, the contact surface configured to bend each sheet and thereby change the direction of motion of each sheet as it advances past the guide;

a gate connected to the guide;

a sensor in operative communication with the gate; and the guide moveable between a first position in which there is no sheet media advancing past the guide and the sensor outputs a first signal and a second position in which a single sheet is advancing against and moving the guide and the sensor outputs a second signal different from the first signal.

2. A detector according to claim 1, wherein the sensor comprises a light source and a light sensor disposed with respect to one another so that light from the light source may be sensed by the light sensor.

3. A detector according to claim 2, wherein the gate blocks light to the light sensor when the guide is in the first position and the gate does not block light to the light sensor when the guide is in the second position.

4. A detector according to claim 3, further comprising a detection zone between the light source and the light sensor, the gate passable through the detection zone and the gate having a variable degree of light transmissibility.

5. A print media weight detector, comprising:

a moveable media guide having a media contact surface, a leading portion and a trailing portion, the leading portion of the guide pivotally mounted to a base, the contact surface curved to bend each sheet and thereby change the direction of motion of each sheet as it advances past the guide;

a biasing element operatively coupled to the guide, the contact surface of the guide resisting the print media at the urging of the biasing element; and a sensor responsive to movement of the guide.

6. A detector according to claim 5, wherein the biasing element is a spring.

7. A detector according to claim 5, wherein the guide is moveable between a first position in which there is no sheet media advancing past the guide and the sensor outputs a first signal and a second position in which a single sheet is advancing against and moving the guide and the sensor outputs a second signal different from the first signal.

8. A detector according to claim 7, wherein the sensor comprises a light source and a light sensor disposed with respect to one another so that light from the light source may be sensed by the light sensor.

9. A detector according to claim 8, wherein the trailing portion of the guide blocks light to the light sensor when the guide is in the first position and the trailing portion of the guide does not block light to the light sensor when the guide is in the second position.

* * * * *